(12) United States Patent
Isaacs

(10) Patent No.: US 8,322,092 B2
(45) Date of Patent: Dec. 4, 2012

(54) GEOSOLAR TEMPERATURE CONTROL CONSTRUCTION AND METHOD THEREOF

(75) Inventor: Mark Isaacs, Louisville, KY (US)

(73) Assignee: GS Research LLC, Louisville, KY (US)

(*) Notice: Subject to any disclaimer, the term of this patent is extended or adjusted under 35 U.S.C. 154(b) by 35 days.

(21) Appl. No.: 12/608,473

(22) Filed: Oct. 29, 2009

(65) Prior Publication Data

US 2011/0100590 A1    May 5, 2011

(51) Int. Cl.
*E04C 2/52* (2006.01)

(52) U.S. Cl. .......... 52/220.1; 165/48.2; 165/45; 165/10; 165/49; 237/69; 62/260

(58) Field of Classification Search .......... 52/220.1; 165/48.1, 48.2, 45, 10, 49, 56; 237/69; 62/260
See application file for complete search history.

(56) References Cited

U.S. PATENT DOCUMENTS

| | | | |
|---|---|---|---|
| 1,640,065 A | 8/1927 | Blaw | |
| 2,645,928 A | 7/1953 | Roos | |
| 2,743,602 A | 5/1956 | Dunn | |
| 4,000,851 A * | 1/1977 | Heilemann | 126/587 |
| 4,062,489 A | 12/1977 | Henderson | |
| 4,069,973 A | 1/1978 | Edwards | |
| 4,075,799 A | 2/1978 | Lemelson | |
| 4,127,973 A * | 12/1978 | Kachadorian | 52/169.11 |
| 4,227,566 A * | 10/1980 | Stilber | 165/45 |
| 4,231,351 A | 11/1980 | Pheils, Jr. | |
| 4,250,670 A | 2/1981 | Garner | |
| 4,289,115 A * | 9/1981 | O'Hanlon | 126/620 |
| 4,306,395 A | 12/1981 | Carpenter | |
| 4,335,548 A | 6/1982 | Rehbein | |
| 4,375,831 A * | 3/1983 | Downing, Jr. | 165/48.1 |
| 4,439,959 A * | 4/1984 | Helfman | 52/90.1 |
| 4,523,519 A * | 6/1985 | Johnson | 454/185 |
| 4,557,084 A | 12/1985 | Dumbeck | |
| 4,607,791 A | 8/1986 | Gantner | |
| 4,653,241 A | 3/1987 | Bindi | |
| 4,842,048 A * | 6/1989 | Higaki | 165/45 |
| 4,967,729 A * | 11/1990 | Okumura | 126/632 |
| 4,998,393 A | 3/1991 | Baena | |
| 5,054,252 A * | 10/1991 | Newman | 52/169.14 |
| 5,433,049 A | 7/1995 | Karlsson et al. | |

(Continued)

FOREIGN PATENT DOCUMENTS

DE    3237317    4/1984

(Continued)

OTHER PUBLICATIONS

Korean Intellectual Property Office, The International Search Report and the Written Opinion of the International Searching Authority, or the Declaration, Search Report and Written Opinion, Jul. 1, 2011, pp. 1-9, Korean Intellectual Property Office, Republic of Korea.

*Primary Examiner* — William Gilbert
*Assistant Examiner* — Chi Q Nguyen
(74) *Attorney, Agent, or Firm* — Middleton Reutlinger; James E. Cole

(57) ABSTRACT

A geosolar temperature control construction for buildings and method of controlling building temperature by using both geo-exchange and solar means.

17 Claims, 11 Drawing Sheets

U.S. PATENT DOCUMENTS

| | | | |
|---|---|---|---|
| 5,934,036 A | 8/1999 | Gallagher, Jr. | |
| 5,941,238 A * | 8/1999 | Tracy | 126/641 |
| 5,957,378 A | 9/1999 | Fiedrich | |
| 6,009,612 A | 1/2000 | Fiedrich et al. | |
| 6,220,339 B1 * | 4/2001 | Krecke | 165/48.2 |
| 6,293,120 B1 * | 9/2001 | Hashimoto | 62/260 |
| 6,557,774 B1 | 5/2003 | Krueger | |
| 6,568,136 B2 | 5/2003 | Aso | |
| 6,619,557 B1 | 9/2003 | Bonura et al. | |
| 6,718,722 B2 | 4/2004 | Worrell et al. | |
| 6,810,945 B1 * | 11/2004 | Boissevain | 165/45 |
| 6,886,303 B2 | 5/2005 | Schmidt | |
| 7,028,685 B1 * | 4/2006 | Krecke | 126/633 |
| 7,032,649 B2 | 4/2006 | Schulak | |
| 7,187,854 B2 | 3/2007 | Sauvageau et al. | |
| 7,234,314 B1 | 6/2007 | Wiggs | |
| 7,261,145 B2 | 8/2007 | Ichiyama et al. | |
| 7,337,838 B2 | 3/2008 | Platell | |
| 7,377,122 B2 | 5/2008 | Kidwell et al. | |
| 7,407,004 B2 | 8/2008 | Kugemoto | |
| 7,410,104 B2 | 8/2008 | MacPherson | |
| 7,571,762 B2 | 8/2009 | Ross | |
| 7,617,697 B2 | 11/2009 | McCaughan | |
| 7,658,222 B2 | 2/2010 | Rudnicki | |
| 7,789,740 B2 * | 9/2010 | Janesky | 454/251 |
| 2002/0117596 A1 | 8/2002 | McCracken | |
| 2004/0003550 A1 | 1/2004 | Konopka | |
| 2006/0213637 A1 | 9/2006 | Laroche | |
| 2007/0039715 A1 | 2/2007 | Brett | |
| 2007/0144093 A1 | 6/2007 | Messenger et al. | |
| 2007/0151704 A1 | 7/2007 | Elmore | |
| 2007/0199266 A1 | 8/2007 | Geilen | |
| 2007/0257124 A1 | 11/2007 | Bates | |
| 2008/0010736 A1 | 1/2008 | Hubbard et al. | |
| 2008/0028719 A1 | 2/2008 | Rutledge | |
| 2008/0060786 A1 | 3/2008 | Warnelov et al. | |
| 2008/0111034 A1 | 5/2008 | MacDuff | |
| 2008/0149301 A1 | 6/2008 | Jatkar | |
| 2008/0185122 A1 | 8/2008 | Kidwell et al. | |
| 2008/0209933 A1 | 9/2008 | Kidwell et al. | |
| 2008/0230205 A1 | 9/2008 | Seguin et al. | |
| 2008/0236784 A1 | 10/2008 | Liebel | |
| 2009/0001185 A1 | 1/2009 | Kroll et al. | |
| 2009/0049763 A1 | 2/2009 | Blundell et al. | |
| 2009/0084518 A1 | 4/2009 | Panula et al. | |
| 2009/0084519 A1 | 4/2009 | Panula et al. | |

FOREIGN PATENT DOCUMENTS

| | | |
|---|---|---|
| JP | 06129715 | 5/1994 |
| JP | 2000314535 | 11/2000 |
| JP | 2003013511 | 1/2003 |
| JP | 2005241041 | 9/2005 |
| JP | 2005147643 | 6/2006 |
| JP | 2006152670 | 6/2006 |
| JP | 2007183023 | 7/2007 |
| JP | 2008121960 A | 5/2008 |

* cited by examiner

GEOSOLAR TEMPERATURE CONTROL CONSTRUCTION AND METHOD THEREOF

CROSS-REFERENCE TO RELATED APPLICATION SUBJECT TO GRANT FILED WITH FEDERAL GOVERNMENT

In accordance with 37 CFR §404, the materials contained in this application may be subject of Federal Grant Application No. DE-FOA-0000115 and therefore Applicant acknowledges that the Federal government may have a non-exclusive, nontransferable, irrevocable, paid-up license to practice or have practiced for or on behalf of the United States the subject invention throughout the world.

TECHNICAL FIELD

The present invention relates generally to geosolar temperature control construction for buildings. More specifically, the present invention relates to a construction for and method of controlling building temperature by using both geo-exchange and solar means.

BACKGROUND

With the increase in "green" building goals and a desire to increase energy savings and conserve natural resources, it has become very desirable to examine new construction techniques and methods of meeting the goals of energy conservation and improved use of non-renewable resources. One desire is to provide near or net zero energy buildings where the annual energy to maintain comfort within the building envelope is met onsite through renewable resources.

Additionally, it is highly desirable to effect improvements in climate change which is regarded as a priority of countries around the globe. Reducing usage of fossil fuels leads to decreases in greenhouse gas production in order to avoid potential negative impacts of climate change.

It is also desirable to develop a clean and cost-effective path to a secure energy future, resulting in increased green job creation.

SUMMARY

A geosolar temperature control building construction system wherein a concrete wall defines a temperature delivery system, comprising the concrete wall having insulation on at least an outer surface, the concrete wall structure positioned at a first elevation in the earth, the first elevation being below a frost line for a region where the building construction is located, a passive thermal transfer system comprising an inwardly facing surface of the concrete wall having insulation removed at the first elevation to expose the concrete wall to thermal conditions at the first elevation and thermally couple the building to the earth, the concrete wall defining an exterior wall of the building construction generally near a floor slab, the floor slab positioned at a second elevation of the concrete wall above the first elevation, an active thermal transfer system comprising a closed loop piping system having a plurality of a horizontally extending pipes disposed beneath the floor slab, the plurality of horizontally extending pipes further extending upwardly through the insulated concrete wall, a first thermal transfer liquid passing through the closed loop piping system, the first thermal transfer fluid receiving thermal energy in the horizontally extending pipes beneath the slab from at least one temperature controlled zone and actively transferring the thermal energy to the exterior walls, at least one window in the exterior wall, the exterior wall having a plurality of exposed surfaces on an inside of the exterior wall, the closed loop piping of the active thermal transfer system disposed adjacent the exposed surfaces to transfer thermal energy into or out of the building and control interior building temperature, and, a geosolar thermal transfer system comprising a solar collector and at least one vertically extending solar recharge loop, the geosolar thermal transfer system receiving solar energy for storage in the earth beneath the building construction or discharging thermal energy from the ground to atmosphere to create the at least one temperature controlled zone beneath the building construction. The geosolar temperature control building construction further comprising a plurality of temperature controlled zones beneath the building construction. The geosolar temperature control building construction wherein one of the plurality of temperature controlled zones is a comfort zone having a temperature of between about 50 degrees and 90 degrees. The geosolar temperature control building construction wherein the closed loop piping of the active thermal transfer system extends along a roof of the building. The geosolar temperature control building construction wherein the geosolar thermal transfer system discharges thermal energy from the earth in the area adjacent the recharge loop in winter. The geosolar temperature control building construction wherein the geosolar thermal transfer system charges thermal energy in the earth in the area adjacent the recharge loop in summer. The geosolar temperature control building construction wherein the insulated concrete wall is formed of one of cast-in-place concrete, pre-cast concrete, core-filled concrete block, or insulated concrete form.

A geosolar temperature control building construction comprises an insulated concrete wall having a lower portion below grade elevation and an upper portion above the grade elevation, with the lower portion set a certain distance below a frost line for a location of the building, and the insulated concrete wall defining a portion of a building envelope, a floor slab disposed near grade elevation and adjacent to the insulated concrete wall at the inside of the wall, the lower portion having an inwardly facing surface with the insulation removed defining exposed concrete at a depth below the grade elevation, the exposed concrete coupled to a temperature zone and passively transferring thermal energy at a desired temperature to the building envelope to buffer ambient temperature conditions, an active thermal transfer system comprising piping disposed within the upper portion of the insulated concrete wall having a first thermal transfer fluid therein, a geosolar thermal transfer system comprising at least one horizontally extending pipe beneath the floor slab, the at least one horizontally extending pipe in fluid communication with the active thermal transfer system, the active thermal transfer system having at least one pipe on a side of a window jamb so that the concrete wall at least one of said jamb, a sill or other interior surface of the exterior wall are thermally coupled to the building interior and deliver heat to or cool the building interior to maintain interior thermal comfort, the geosolar thermal transfer system further comprising a solar collector to charge or discharge thermal energy from a second thermal transfer fluid, the second thermal transfer fluid capable of being mixed with the first thermal transfer fluid to control temperature within the building envelope. The geosolar temperature control building construction wherein the at least one horizontal pipe of the geosolar thermal transfer system beneath the floor slab creates temperature zones beneath the building and the piping of the active thermal transfer system receives the thermal energy within the temperature zone by passing the first thermal transfer fluid therethrough. The geosolar temperature control building construction wherein the geosolar thermal transfer system capable of storing thermal energy in or discharging thermal energy from the earth beneath the building construction. The geosolar temperature control building construction wherein the stored thermal energy capable of being harvested for building warming. The geosolar temperature control building construction wherein the discharged thermal energy creates areas of decreased temperature which may be harvested for building cooling.

A geosolar temperature control building wherein an insulated concrete wall defines a temperature delivery system, comprises a building envelope defined by an insulated concrete wall having an upper exterior portion generally above grade and an insulated foundation portion generally below grade, the insulated concrete foundation portion extending below a frost line for a location of the building and having an inwardly facing surface being exposed to transfer thermal energy with the earth at a depth below the frost line, the insulated concrete foundation portion defining a thermal exchange and storage area in the earth below the building which define a plurality of temperature zones, an active thermal transfer system having a first thermal transfer fluid and a plurality of pipes extending upwardly into the building envelope and a plurality of distribution loops extending substantially vertically into the earth and beneath the building, a geosolar thermal transfer system having a second thermal transfer fluid and a plurality of recharge loops extending substantially vertically into the ground, the recharge loops charging or discharging the earth with thermal energy, the plurality of distribution loops absorbing or discharging the thermal energy and passing the first thermal transfer fluid into the building envelope, the exterior wall having a plurality of windows, at least one exposed wall surface on an interior of the building, at least one of the plurality of pipes disposed within the upper exterior portion of the building, the exposed wall surface radiating or absorbing thermal energy transferred from the at least one of the plurality of pipes to control interior building temperature; and, the geosolar thermal transfer system further comprising a solar collector for collection of solar energy or discharge of thermal energy, the solar collector in thermal communication with the second thermal transfer fluid and the plurality of recharge loops. The geosolar temperature control building wherein the plurality of distribution loops and the plurality of recharge loops are substantially vertically oriented beneath said floor slab. The geosolar temperature control building wherein the plurality of recharge loops are surrounded by the plurality of distribution loops. The geosolar temperature control building wherein the first thermal transfer fluid is separate from the second thermal transfer fluid.

A method of controlling building temperature utilizing the building walls, comprising the steps of storing energy in a thermal exchange area in the earth beneath a building, the thermal exchange area defined by an insulated concrete foundation wall set at a level lower than standard foundation frost lines, thermally coupling and passively transferring thermal energy between the building foundation wall and the thermal exchange area by removing insulation from the inside surface of a lower portion of the insulated concrete foundation wall and also passively transferring thermal energy between the thermal exchange area and an uninsulated floor slab, actively transferring the thermal energy from the thermal exchange area upwardly through one or more pipes in a building exterior wall, transferring the thermal energy through the building exterior walls to surfaces exposed to an interior space, adjacent at least one of windows or doors in said exterior wall, radiating or absorbing the thermal energy through the exposed surfaces to maintain interior thermal comfort, and, charging thermal energy into the thermal exchange area by collection of solar energy, or discharging thermal energy from the thermal exchange area via night sky radiation, whereby the building envelope becomes the temperature delivery system.

BRIEF DESCRIPTION OF THE ILLUSTRATIONS

In order that the invention may be better understood, embodiments of the Geosolar Temperature Control Construction and Method thereof in accordance with the present invention will now be described by way of examples. These embodiments are not to limit the scope of the present invention as other embodiments of the Construction and Method of the present invention will become apparent to one having ordinary skill in the art upon reading the instant description. Examples of the present invention are shown in figures wherein.

DETAILED DESCRIPTION

Figure 1:
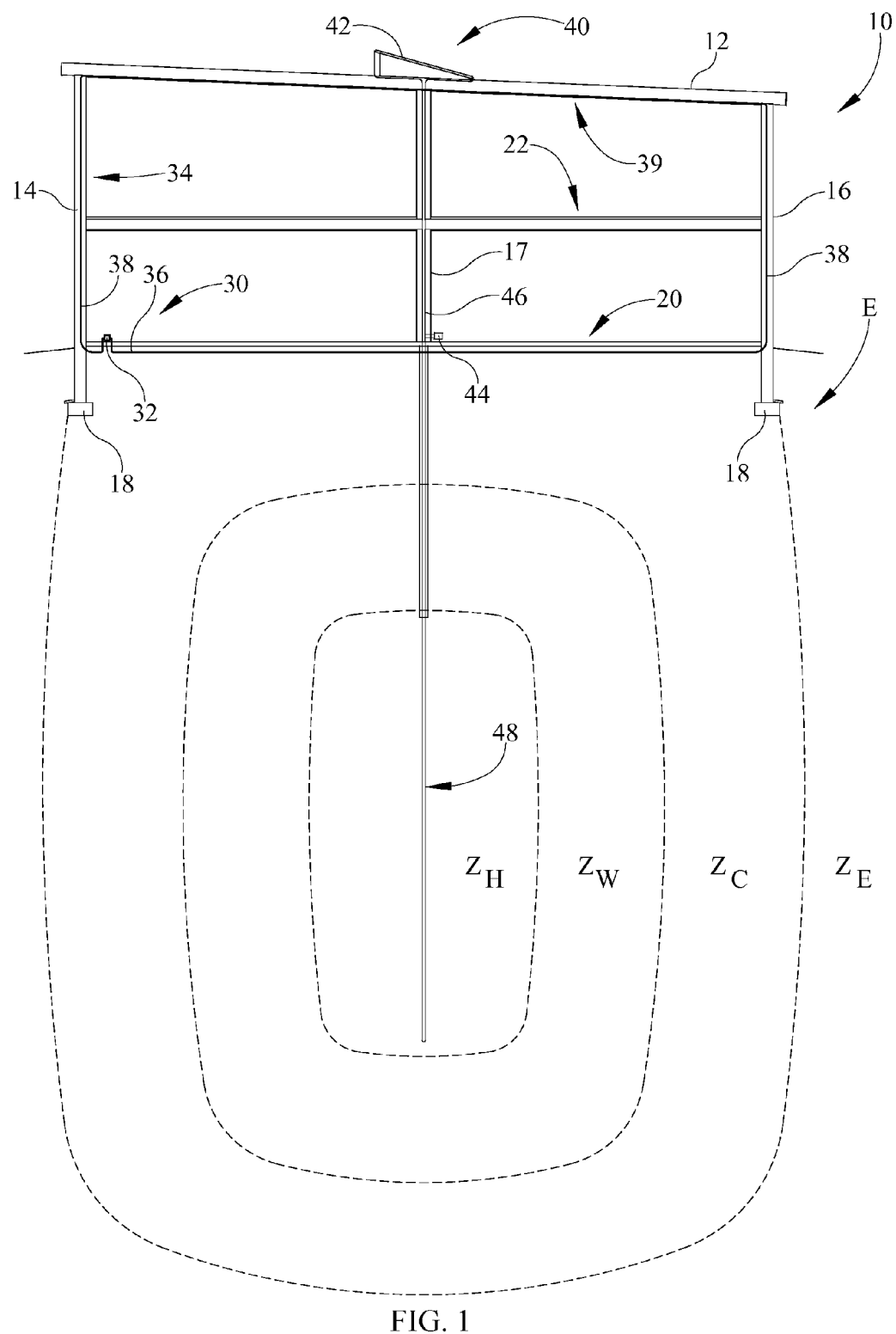
FIG. 1 is a view of a building section of one embodiment of an exemplary geosolar building construction.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

As shown in the various FIGS. 1-10, a geosolar building construction is depicted. The geosolar construction utilizes the more constant temperature of the earth and a thermal exchange and storage area beneath the building to passively transfer energy to the building via contact with the slab and coupling with portions of the foundation walls. The geosolar construction also actively transfers energy from the thermal exchange and storage area by pumping thermal energy transfer fluid through pipes extending from the earth into the exterior walls of the building to either remove or gain thermal energy. Additionally, solar energy is utilized to create temperature zones within the one or more thermal exchange and storage areas beneath the building. These zones are used by the passive and active thermal transfer systems to create comfortable indoor temperatures. In combination, the geosolar temperature control construction yields the potential of practical near and net zero energy buildings where the annual energy to maintain comfort within the building envelope is met on-site through renewable resources and the temperature stabilizing mass of the ground enclosed by the building foundation. Greater thermal comfort is made possible by way of the temperature buffering qualities of the earth-coupled building mass that yields Mean Radiant Temperatures (MRT) along the inside of exterior walls, floors and ceilings to maintain year-round comfort.

Figure 2:
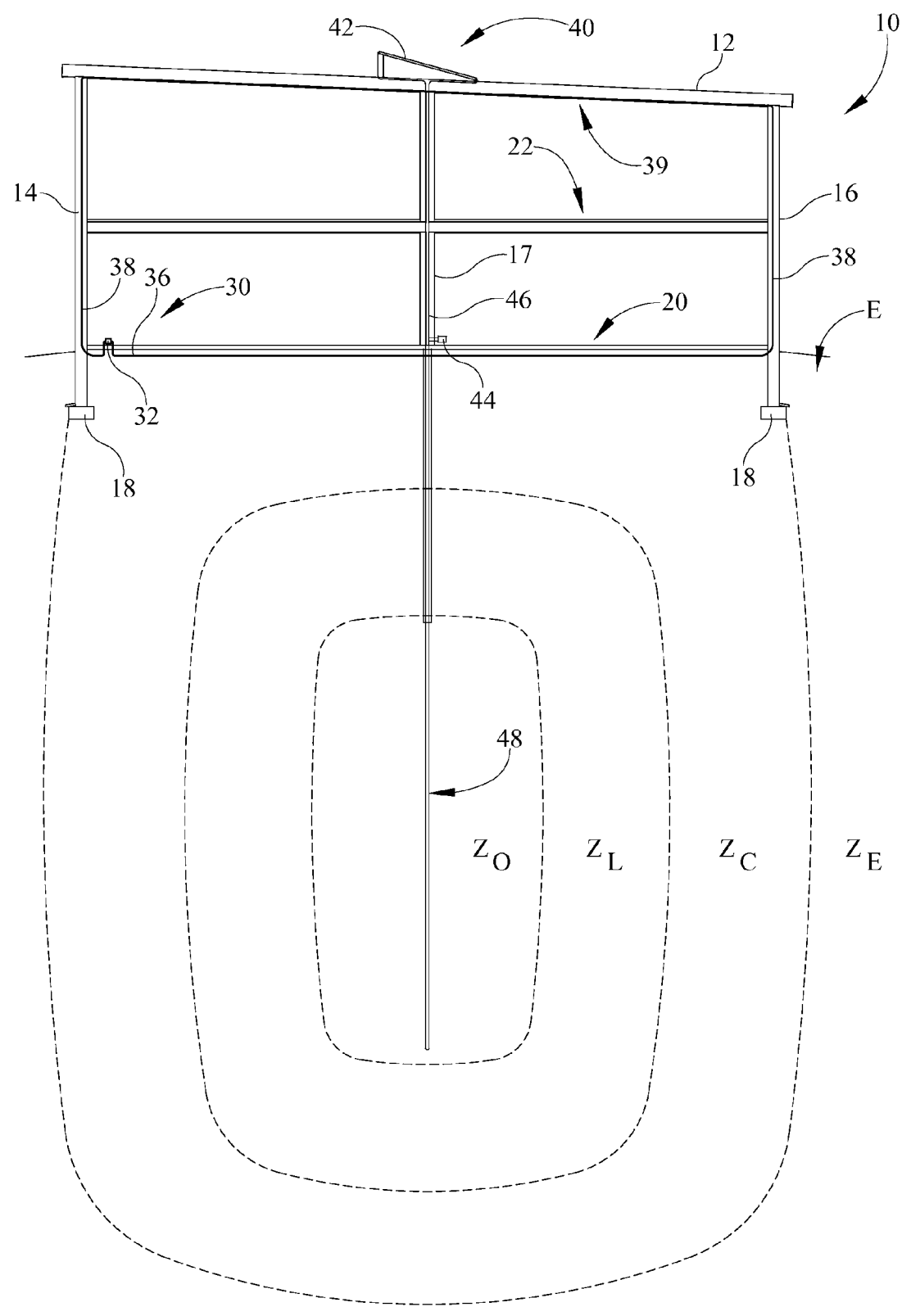
FIG. 2 is a view of the construction of FIG. 1 depicting the differing temperature zones when the system operates in an opposite season from FIG. 1.

Referring now to FIG. 1, a building section view of a first embodiment of the geosolar building construction 10 is depicted. The construction provides for both passive and active thermal transfer as well as charging and discharge by geosolar means. It should be briefly noted that although FIGS. 1 and 2 are section views, any cross-hatching indicative of a section cut has been removed for sake of clarity of the systems and components depicted. The section view of building 10 depicts a roof 12 which may be formed of concrete or other materials and also includes some amount of insulation between the exterior roof surface and the interior of the building 10. For example, exterior roof material could be formed of metal, shingle roofing, or other materials including but not limited to single ply membranes any of which have an underlying insulation layer or material. These materials are however merely exemplary and should not be considered limiting. Supporting the roof 12 are at least a first wall 14 and a second wall 16. Each of the first wall 14 and second wall 16 extend from the roof 12 into the earth E supporting the building. This creates a thermal exchange and storage area in the ground beneath building 10 generally wherein temperature zones are created. The walls 14, 16 may each extend continuously in a single piece or may be defined by multiple pours of concrete. Alternatively, the concrete walls 14, 16 may be formed of precast or cast-in-place concrete with exterior insulation, concrete block with mortar-filled cores with exterior insulation or insulated concrete forms. In any event, the concrete, precast or poured, is insulated on at least exterior sides in order to limit or eliminate thermal transfer through the concrete from interior to exterior or vice-versa. Additionally, if insulated concrete forms are utilized, the insulated concrete form should be understood to be insulated on both sides— interior and exterior—of the wall. The walls 14, 16 may be formed of concrete alone or in combination with steel beams in order to provide a building frame or skeleton upon which the concrete is poured or otherwise connected. The walls 14,16 may also be connected with wood frame structures. The walls 14, 16 may have preformed apertures through which piping may extend as described further herein. The exterior and interior finishes of the building 10 may be comprised of various known materials which are known in the art of building construction. These materials are not shown since they will be understood to one of ordinary skill in the art and would render visualization and understanding of the energy relevant components of the building difficult to ascertain.

The building 10 further comprises at least one floor 20, generally at ground level. The floor 20 is also formed of concrete or other known material which is known in the art of building construction. According to the exemplary embodiment depicted in FIG. 1, the exemplary building 10 further comprises a second floor 22 which extends generally between the first wall 14 and second wall 16. The building 10 also comprises a central support wall 17 extending between the floor 20 and the roof 12.

At the bottom of the first and second walls 14, 16 are foundation footings 18. These footings 18 are disposed within the earth E surrounding the building 10 and transfer the weight of the building to the earth E. The footers 18 are disposed at a depth which is some preselected distance below a frost line. The footings 18 may also have some amount of insulation 53 (FIG. 4) along all or some of the structures.

As previously described, the building 10 includes an active thermal transfer system 30. The active thermal transfer system 30 provides active thermal transfer between the building 10 and the earth E to buffer from external ambient conditions as well as regulate indoor temperature conditions. The active thermal system 30 receives thermal energy in the comfort zone $Z_C$ beneath the floor 20 and circulates the thermal energy through the building 10. The active thermal transfer system 30 includes at least one pump 32 and at least one thermal transfer distribution loop 34. The loop 34 may be defined by a pipe having a thermal transfer fluid therein. Although the loop 34 is defined by one fluid flow, one or more pipes may be used. In the instant embodiment, a first piping portion 36 extends either within or beneath the floor 20. This provides one means of transferring energy from the earth to the system 30 within the building 10. The distribution loop 34 also comprises a fluid flow pipe 38 in fluid communication with pipe 36 and extending upwardly through the first and second walls 14, 16. The loop 34 is also defined by at least one fluid flow pipe 39 extending within or immediately beneath the roof material 12. The various pipes 36, 38 and 39 generally envelope the building 10 and are in fluid communication with each other and with the at least one pump 32, and in thermal communication with the earth E beneath the floor 20. The distribution loop 34 moves a first thermal transfer fluid, such as water or other liquid, through the exterior walls and through or just under the floor slab 20 of the building 10. In operation, the distribution loop 34 actively transfers thermal energy between the earth E and the building either from the building 10 to the earth E or from the earth E to the building 10. For example, in the winter, when the Earth temperature is greater than the outside temperature, the fluid will receive thermal energy beneath the floor 20, and transfer the energy to the walls 14, 16 and the roof 12. In the summer, when the outside temperature is greater than the Earth temperature, the temperature beneath the floor 20 will cool the fluid in system 30 which cools the walls 14, 16 and roof 12.

In addition to the active thermal transfer system 30, the building 10 further comprises a geosolar thermal transfer system 40, which converts solar energy to fluid thermal energy within a second thermal transfer fluid, such as water or other liquid, within the solar thermal transfer system 40. The geosolar thermal transfer system 40 either charges or discharges thermal energy with the earth beneath the building 10 in one or more thermal exchange and storage areas. This creates radial thermal zones. The geosolar thermal transfer system 40 includes at least one solar collector 42 which collects solar energy and passes that energy to the second thermal transfer fluid. The solar collector 42 is shown positioned on the building roof 12, however, the solar collector 42 may alternatively be positioned on an awning, building side or any combination thereof. The solar thermal transfer system 40 also includes a pump 44 to move the fluid through at least one pipe 46 disposed within the central wall 17. The pipe 46 continues extending downward through the floor 20 and into a geosolar recharge loop 48. This loop transfers thermal energy to the earth surrounding the loop 48 so that the energy may be stored for later harvesting. Alternatively, thermal energy may be removed from this thermal exchange area to and provided to the building 10 for purpose of heating. For example, heat may be stored in the summer for winter use and coolness, by way of heat removal, may be created and stored for summer use. The solar recharge loop piping 48 may extend as much as 100 feet or more into the earth. The at least one pipe 46 is insulated where it passes through the building and into the earth E below the floor 20. The length of the insulated portion may depend on the thermal conditions of the region where the building 10 is located and the time it takes stored heat to travel from the hot core zone $Z_H$ to the comfort zone $Z_C$ close to the building.

Referring still to FIG. 1, beneath the building 10, various zones are formed in the thermal exchange and storage area by the thermal transfer of energy to the earth from the geosolar thermal transfer system 40. As shown in FIG. 1, a plurality of thermal zones are established about the geosolar recharge loop 48. The zones shown about the geosolar recharge loop 48 are generally indicative of the late summer/early fall season. From late winter/early spring until late summer/early fall, the solar collector 42 collects energy and transfers that thermal energy to the second fluid that runs through the geosolar recharge loop 48. This heats the earth E beneath the building, and most specifically in the hottest zone $Z_H$ immediately surrounding the loop 48. Moving radially outward, as the temperature is slightly less a warm zone $Z_W$ is defined. Moving further radially outward from there, a comfort zone $Z_C$ is defined. This zone may have a temperature range of between about 50-90 degrees, more preferably about 60-80 degrees and even more preferably about 65-72 degrees Fahrenheit or warmer. Moving further outwardly, the thermal exchange and storage area under the building is surrounded by a somewhat cooler zone $Z_E$ generally having the more constant temperature of the earth typical for the region at a specific depth. These zones are generally defined by the temperature gradients moving radially outward from the loop 48. With the zone $Z_H$ surrounding the recharge loop 48 being the hottest, the thermal energy in this area is stored and radiates toward the building so that it may be harvested in the winter for maintaining comfortable warmth within the building. In the zone of comfort $Z_C$, the building 10 receives thermal energy passively by way of interface with the non-insulated lower area 15 (FIG. 4) of the walls 14,16 and contact with the floor slab 20. Thus the building outside temperature is buffered by the comfort zone $Z_C$ and by exterior insulation through both active and passive means.

Referring now to FIG. 2, the same view of FIG. 1 is depicted but the season is changed to late winter/early spring for purpose of explanation the seasonal variation in the zones of the thermal exchange area or thermal storage reservoir beneath the building. By late winter or early spring, the zone closest to the recharge loop 48 is the coldest $Z_O$ and the next zone $Z_E$ moving radially outwardly is cool but not quite as cold. The next adjacent zone is the comfort zone $Z_C$ preferably having a temperature range of about between 60-80 degrees and more specifically in the range of about 62-78 degrees Fahrenheit. Beyond this radial distance, the temperature is the more constant temperature of the earth typical for the region at similar depth, the earth zone $Z_E$. In order to make the area around the recharge loop 48 coldest, the geosolar thermal transfer system may be operated at night to discharge thermal energy from the earth to the sky in what is termed night sky radiation. As a result of this night sky radiation and discharge of thermal energy, the ground beneath the building 10 is cooler than would otherwise be possible, creating cooling storage, by removal of thermal energy, for the summer season during which time the thermal exchange and storage area beneath the building warms in order to create the hot zone $Z_H$ by the end of the summer that will further create comfort for winter harvesting.

Figure 3:
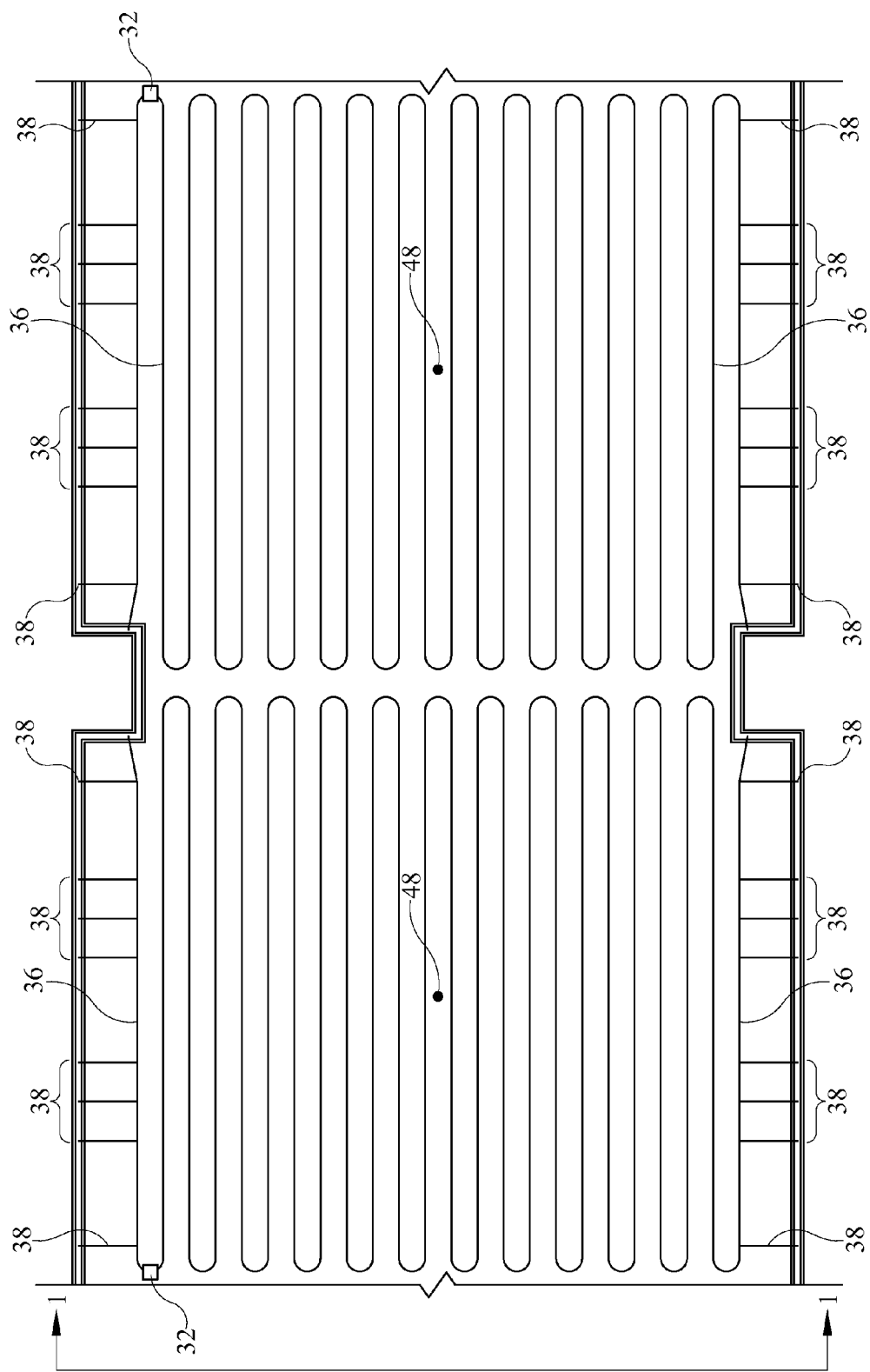
FIG. 3 is a foundation plan view of the building of FIG. 1 utilizing the geosolar building construction.

Referring now to FIG. 3, a foundation plan view of the active thermal transfer system 30 is depicted. With the active thermal transfer system shown, the pump 32 is seen in fluid communication with the serpentine pipe 36 layout beneath the floor slab 20. Also extending upwardly from the horizontally extending pipes 36 are multiple upwardly extending pipes 38 which pass through the first and second walls 14, 16. The pump 32 circulates a first thermal transfer fluid through the horizontal piping 36 and the vertical wall piping 38 as well as the roof piping 39 to actively heat the internal areas of the building 10 or to absorb heat and effect cooling in the building 10, depending on the season.

The foundation plan view also depicts two geosolar recharge loops 48 extending downwardly beneath the building 10. In reference to FIGS. 1, 2 and 3, the exemplary building 10 has two geosolar recharge loops 48 and two active thermal transfer systems 30. However, this description is merely exemplary and should not be considered limiting. Due to the horizontal and vertical piping 36,38 of the active thermal transfer system 30, the exemplary system 30 is termed a hybrid system.

Figure 4:
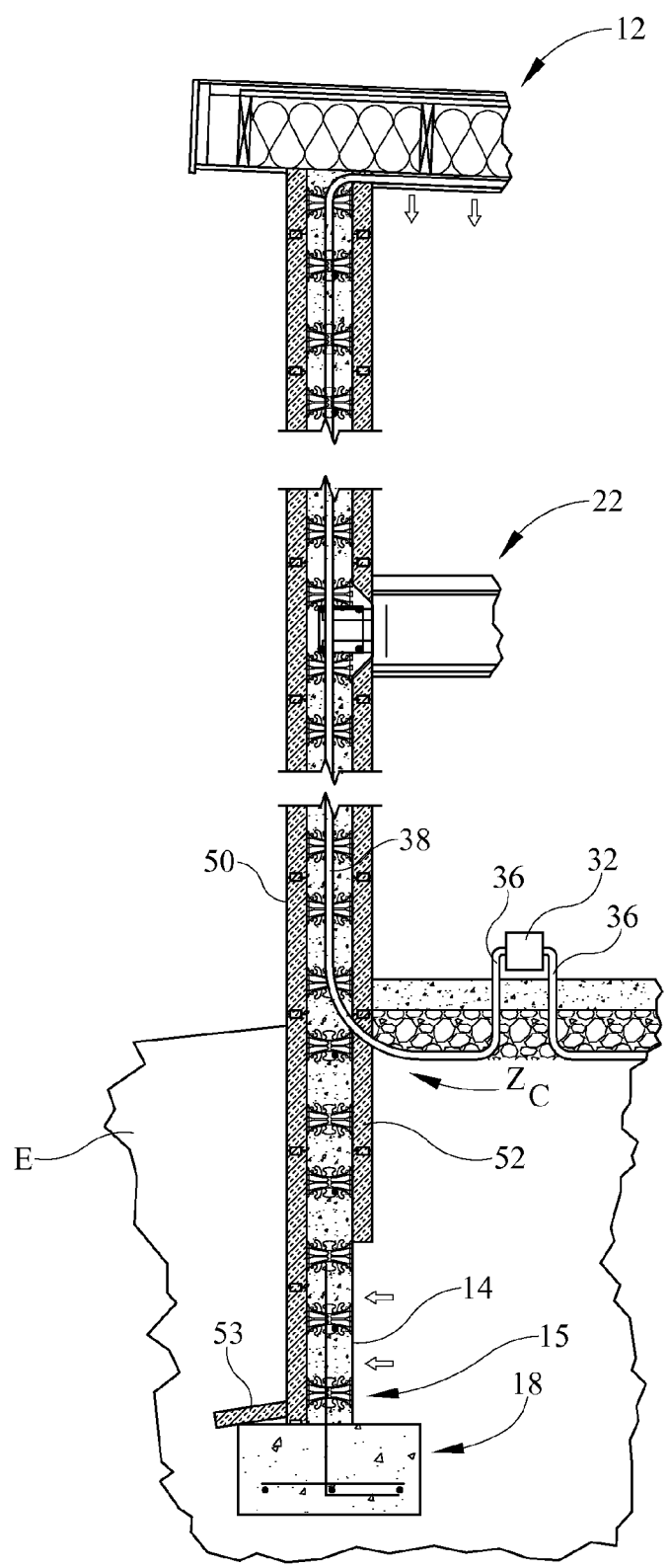
FIG. 4 is a section detail view of an exterior building wall of the exemplary geosolar construction of FIG. 1.

Referring now to FIG. 4, a detail section view of the wall 14 is depicted. For purpose of understanding, on the left side of the wall 14 is the building exterior and on the right side of the wall 14 is the building interior including the second floor 22. At the upper end of the wall 14 is the roof 12. At the bottom of the wall 14 is the footing 18, which provides support for the building wall 14. Along the outer surface of the wall 14 is at least one layer of insulation 50. The footing insulation 53 may cover at least the upper surface of the footing 18. Along the inner surface of the wall 14 is an inner layer of insulation 52, in the case of insulated concrete form walls. The inner insulation 52 is removed at some depth below the surface of the earth E. In this area, the wall 14 is exposed to the temperature of the earth at the depths where temperature is within a desired zone. This allows passive transfer of thermal energy at these depths to the building envelope. Additionally, as one skilled in the art will recognize, the temperature at these depths is closer to the earth constant than at the surface. Accordingly, the building 10 is coupled to the earth E for the passive thermal transfer of energy. In a further alternative embodiment, for instance having core-filled concrete block and concrete walls, it is desirable to maximize the insulation to the outside of the wall and provide full thermal coupling to the comfort zone Zc temperature of the earth close to the building and the interior comfort zone temperature of the building. However, although shown with inner insulation, it should be understood that any of the embodiments described may be utilized with minimal or no inner insulation and should be considered within the scope of the present embodiment.

The pump 32 is shown schematically at the ground level with the distribution loop 34 of the active thermal transfer system 30. The pipes 36 provide input and output flows to and from the pump 32. Additionally, the upwardly extending pipe 38 is also shown passing through the inner insulation 52 and upwardly through the wall 14. As can be understood, the walls 14, 16 must have apertures allowing the pipes to pass there through. Near the roof 12, the pipe 38 is curved to define or otherwise couples with the roof pipe 39.

FIG. 4 also depicts, clearly, two modes of thermal communication between the building 10 and the earth E. First, the building 10 can passively transfer thermal energy through the exposed portion 15 of the insulated concrete wall 14. Second, the building is actively transferring energy to and from the earth via the active thermal transfer system 30 through exposed portions of the building interior. By exposed portions of the building interior or interior surface of exterior wall, Applicant means non-insulated, which should be understood to include either of both of actually exposed interior surfaces as well as surfaces covered by, for instance, drywall, either of these however not being covered with insulation. Such construction thermally couples the building interior with the thermal transfer pipes within the walls of the building.

Figure 5:
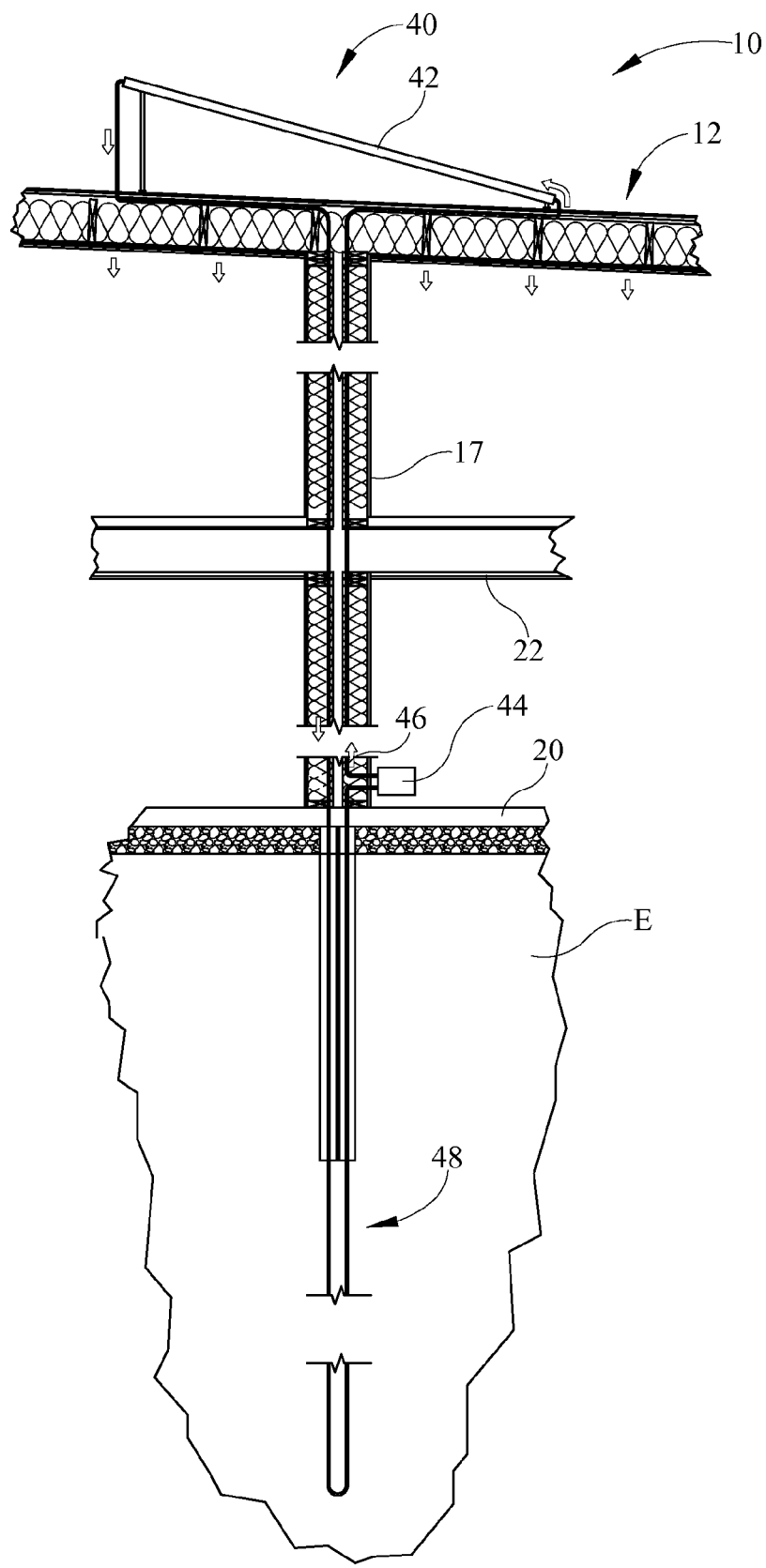
FIG. 5 is a detail section view of the central portion of the exemplary geosolar building construction of FIG. 1.

Referring now to FIG. 5, a section detail of the central area of the building 10 is shown and the geosolar thermal transfer system 40. Extending between the roof 12 and the floor 20 is the central support wall 17. Passing upwardly through the central wall 17 is the piping 46 which extends upward to the solar collector 42 and down to the geosolar recharge loop 48 in the earth. The flow of a second thermal fluid transfer fluid is caused by the pump 44 which is connected at input and output ends to the pipe 46. This defines a fluid flow loop. In operation, the pump 44 causes flow through piping 46 up to the solar collector 42 where the second thermal transfer fluid receives solar energy collected by the collector 42. The second thermal transfer fluid next moves downwardly through the pipes 46 and into the recharge loop 48. In this area, the energy of the second thermal transfer fluid is transferred to the earth E. Alternatively, the second thermal fluid may remove energy from the earth E and discharge to atmosphere through the collectors 42 via night sky radiation.

Figure 6:
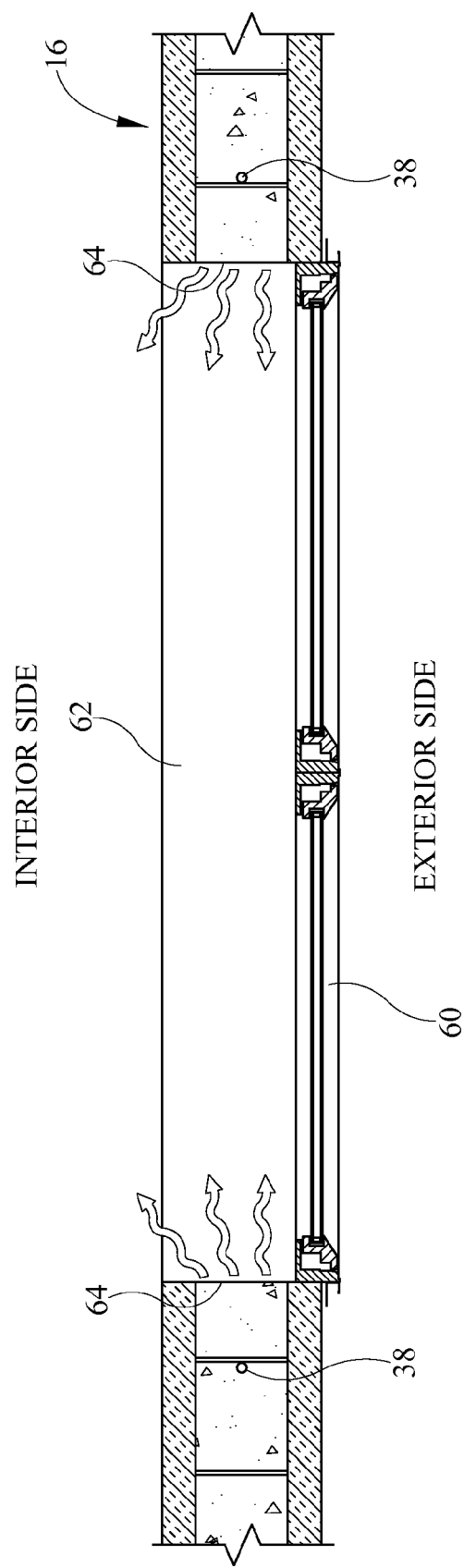
FIG. 6 is a plan section view of an exterior wall and window of the exemplary geosolar building construction.

Referring now to FIG. 6, a plan section view through an exterior window in one of the exterior walls 14, 16 is depicted. The wall 16, for example, is sectioned in the area of a window 60 and the wall 16 is not insulated in the window sill 62 and the vertical surfaces 64 adjacent the frame of the window.

Adjacent the window 60, within the wall 16, are one or more of the upwardly extending pipes 38. The pipes 38 move the first thermal transfer fluid through the wall 16 and the thermal energy is transferred through the exposed areas of the wall 64 and the sill 62 to the building interior to balance the area of greatest thermal energy loss at the window itself. In effect, the energy within the wall 16 and the piping 38 radiates through the exposed concrete 64 and window sill 62 to either heat the building interior in winter or remove heat from the building interior in summer. Although a single window pair 60 is depicted, the construction may be used at one or more various exterior windows to provide radiating thermal energy transfer throughout the building 10.

Figure 7:
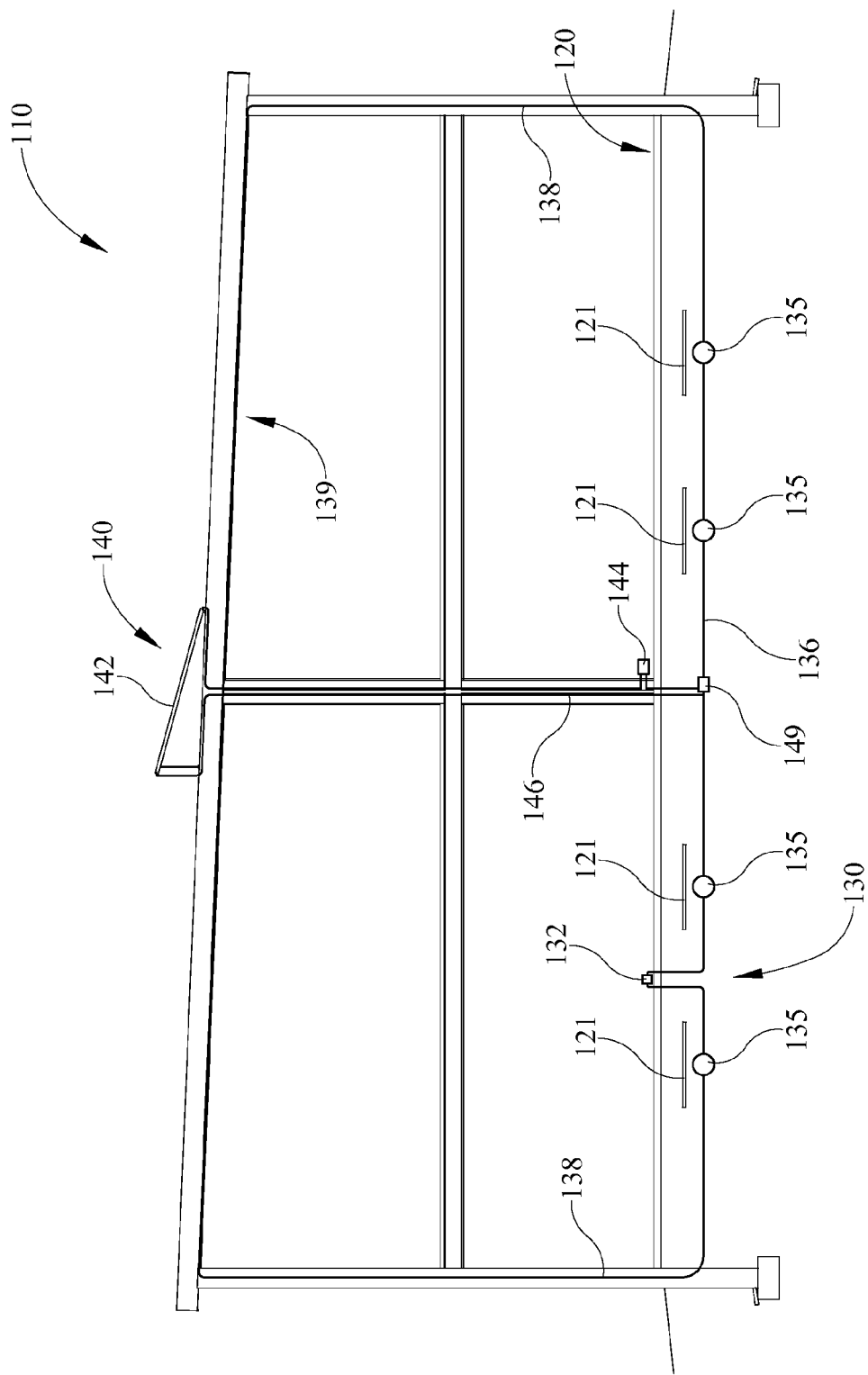
FIG. 7 is a view of a building section of a second embodiment of an exemplary geosolar building construction.
Figure 8:
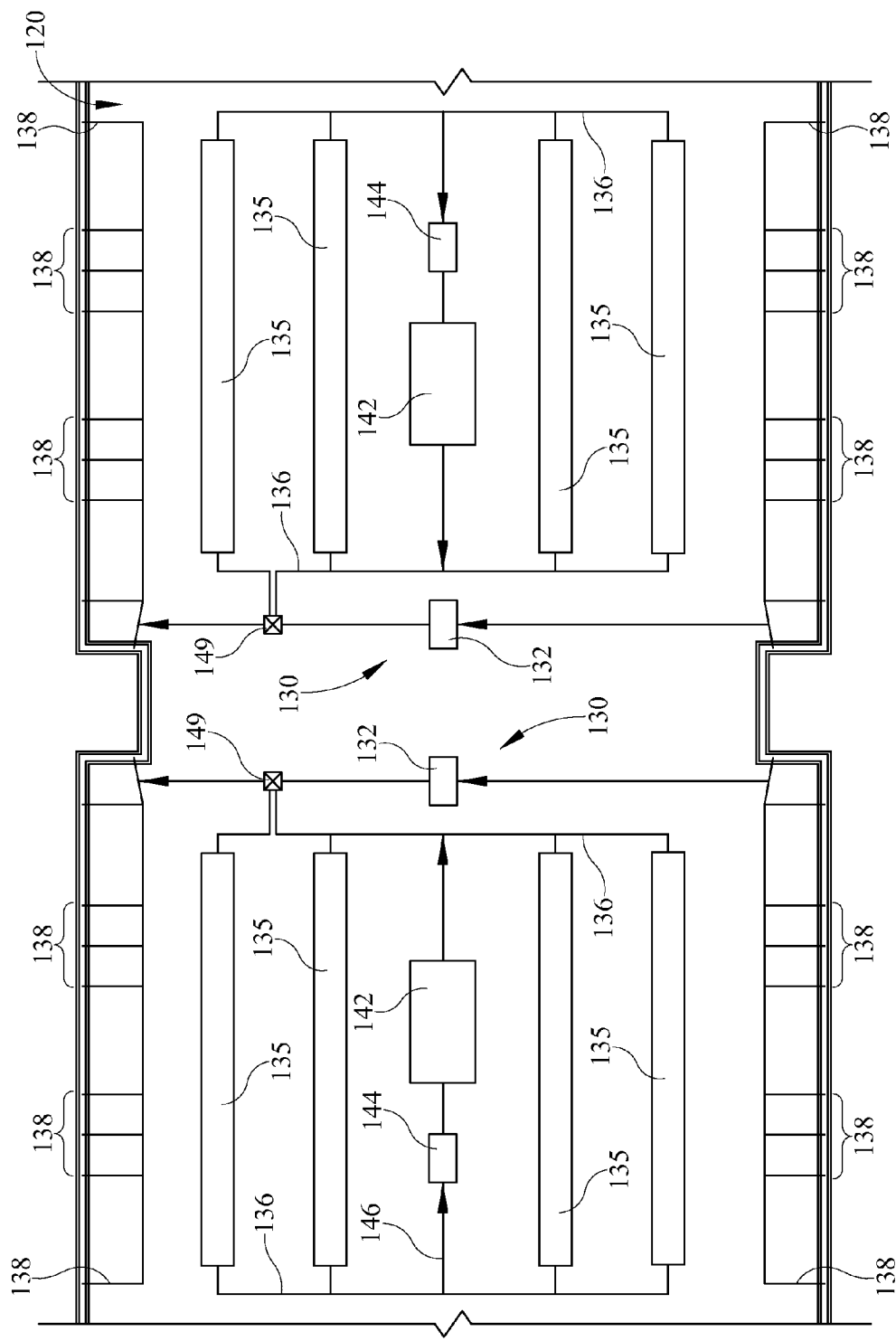
FIG. 8 is a foundation plan view of the second embodiment of FIG. 7.

Referring now to FIGS. 7 and 8, a second embodiment of a geosolar temperature control construction system is depicted wherein the portion of the active thermal transfer system below the floor slab 120 is substantially horizontal. In this embodiment, as opposed to the hybrid embodiment of FIGS. 1-6, there are no vertically extending recharge loops. Thus this system is termed a horizontal system for purpose of distinguishing from the alternate embodiments. In addition to the active thermal transfer system 130, the embodiment also comprises a passive thermal transfer means as well as geosolar thermal transfer system 140.

Referring initially to FIG. 7, a section view of a building 110 is depicted. In this view of building 110, a plurality of substantially horizontal pipes 135 are positioned beneath the floor slab 120. These pipes 135 may be formed of various plastics or other materials and are of larger diameter for larger thermal storage capacity. Above these pipes 135 are one or more pieces of insulation, such as foam insulation. The insulation 121 functions to retain thermal energy within and below the piping 135. Additionally, one or more manifold pipes 136 may connect the segments of piping 135. The piping 135 and one or more manifold pipes 136 are in fluid communication with a pump 132 to force a first thermal transfer fluid upwardly through the walls 14, 16 via upwardly extending piping 138 and on to the roof piping 139. This provides an active thermal transfer system 130 within the building 110.

The second embodiment also provides a passive thermal transfer means. As described with the first embodiment, the second embodiment provides building coupling with the temperature regulated comfort zone of the earth beneath the building 110. As with the first embodiment, the insulated concrete or concrete block wall, or insulated concrete form for example, has the insulation inside the foundation wall removed at a preselected depth below the frost line in order to couple the building 110 to this zone of temperature within the earth E.

A third form of temperature regulation occurs from the geosolar recharge system 140. The geosolar recharging occurs by charging or discharging of thermal energy in order to heat or cool the earth E beneath the slab 120 and in the area of piping 135. Additionally, the geosolar recharge system may be utilized to heat or cool the thermal transfer fluid of the active thermal transfer system 130 by mixing the first thermal transfer fluid with a second thermal transfer fluid being heated or cooled in the geosolar recharge system 140 with a mixing valve 149.

The geosolar recharging system 140 comprises at least one solar collector 142 which receives solar energy or discharges energy through night sky radiation. Piping 146 is connected to the solar collector 142 in order to heat or cool the second thermal transfer fluid. A pump 144 is in fluid communication with piping 146 to pump the second thermal fluid between the solar collector 142 and the manifold 136.

Figure 9:
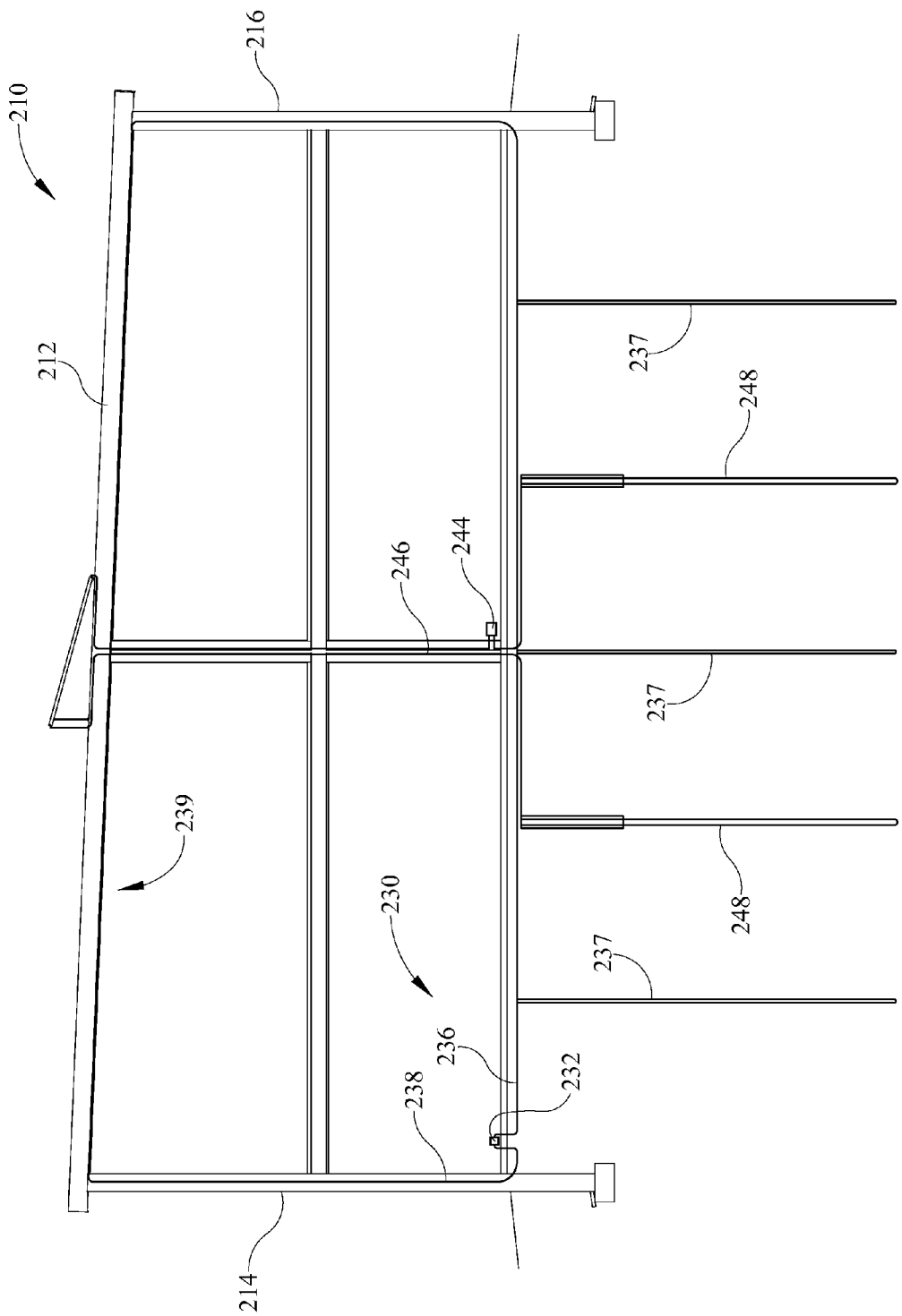
FIG. 9 is a view of a building section of a third embodiment of a geosolar building construction.
Figure 10:
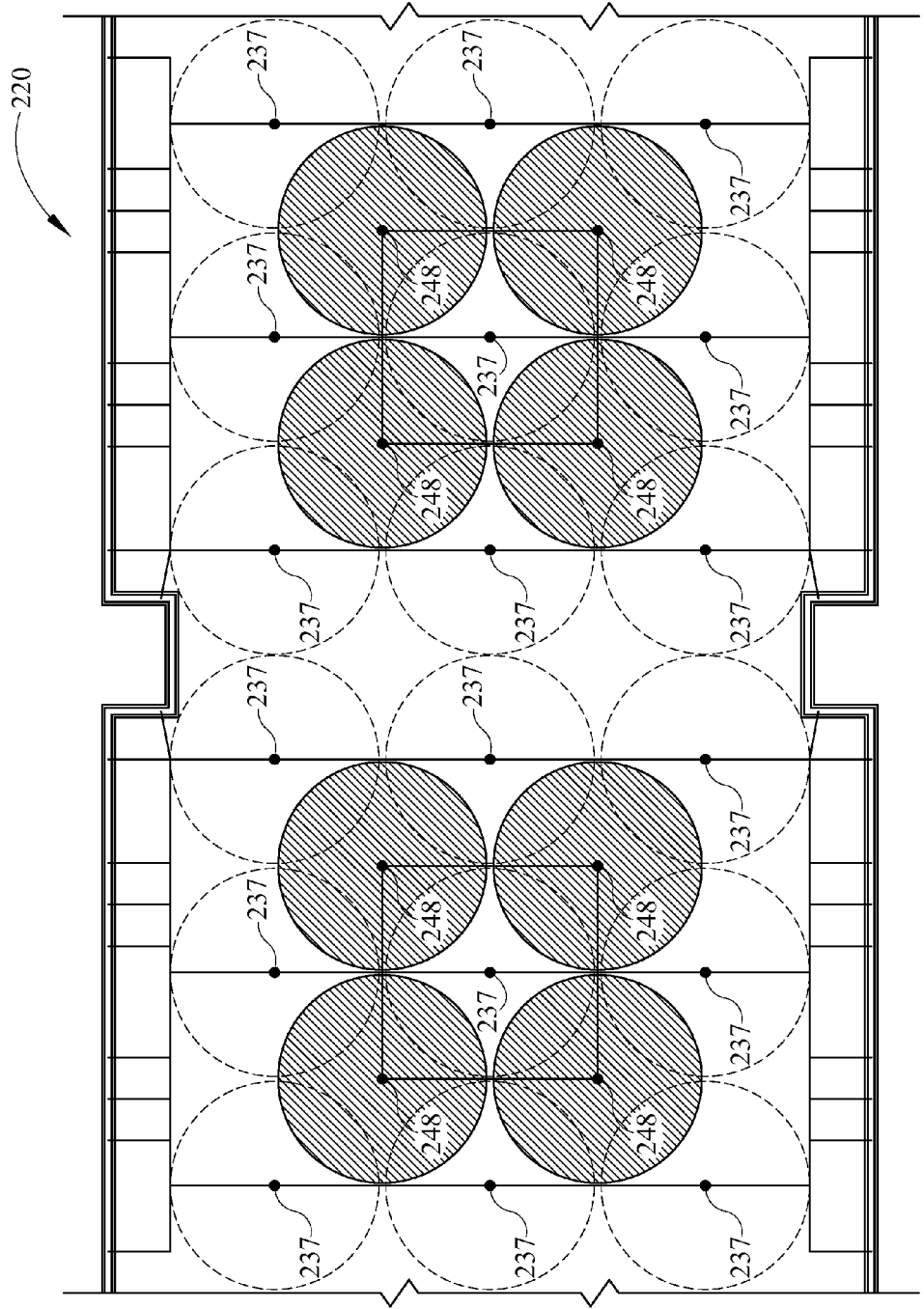
FIG. 10 is a foundation plan view of the third embodiment of the geosolar building construction; and, FIG. 11 is a flow chart depicting an exemplary method of operation.

Referring now to FIGS. 9 and 10, a vertical geosolar temperature control construction system is depicted. Whereas the hybrid system of FIGS. 1-6 incorporated both vertical and horizontal storage and the system of FIGS. 7 and 8 incorporated horizontal storage alone, the system of the instant embodiment orients piping in a substantially vertical direction to store and retrieve thermal energy. Referring first to FIG. 9, a section view of a building is depicted. In the instant embodiment of the building 210 is of similar construction as previously described and therefore will not be repeated. A geosolar thermal transfer system 240 is utilized having a solar collector 242 which transfers solar energy for storage in the earth E, or discharges thermal energy by means of night sky radiation, via the a second thermal transfer fluid. The thermal transfer system 240 also comprises a pump 244 for pumping the second thermal transfer fluid from the solar collector 242 to a plurality of geosolar recharge loops 248, through piping 246 in the central portion of the building 210. Each of the geosolar recharge loops 248 are shaded in FIG. 10 to distinguish from vertical distribution loops 237, which are included in the active thermal transfer system 230.

The active thermal transfer system 230 includes a pump 232 which pumps a first thermal transfer fluid through the vertical pipes extending through the walls 214, 216 to the pipe 239 near the roof 212. The active thermal transfer system 230 includes a plurality of vertical distribution loops 237. As shown in FIG. 10, in the foundation plan view, plurality of vertical distribution loops 237 are positioned about the geosolar recharge loops 248. Although the active thermal transfer system 230 includes some limited horizontal manifold type piping to connect the vertical distribution loops 237, the horizontal piping is limited and hence the active thermal transfer system of this embodiment is termed the vertical system.

The active thermal transfer system 230 utilizes the temperature in the comfort zone $Z_C$ of the earth E to regulate the temperature of the first thermal transfer fluid and subsequently pumps that first fluid through the active thermal transfer system into the building envelope, defined by the walls and roof. As the first fluid moves through the walls 214,216, the first thermal fluid again passes adjacent the window sills and jams, as previously described to radiate heat or absorb heat depending on the building temperature and the temperature around these areas of the windows.

Figure 11:
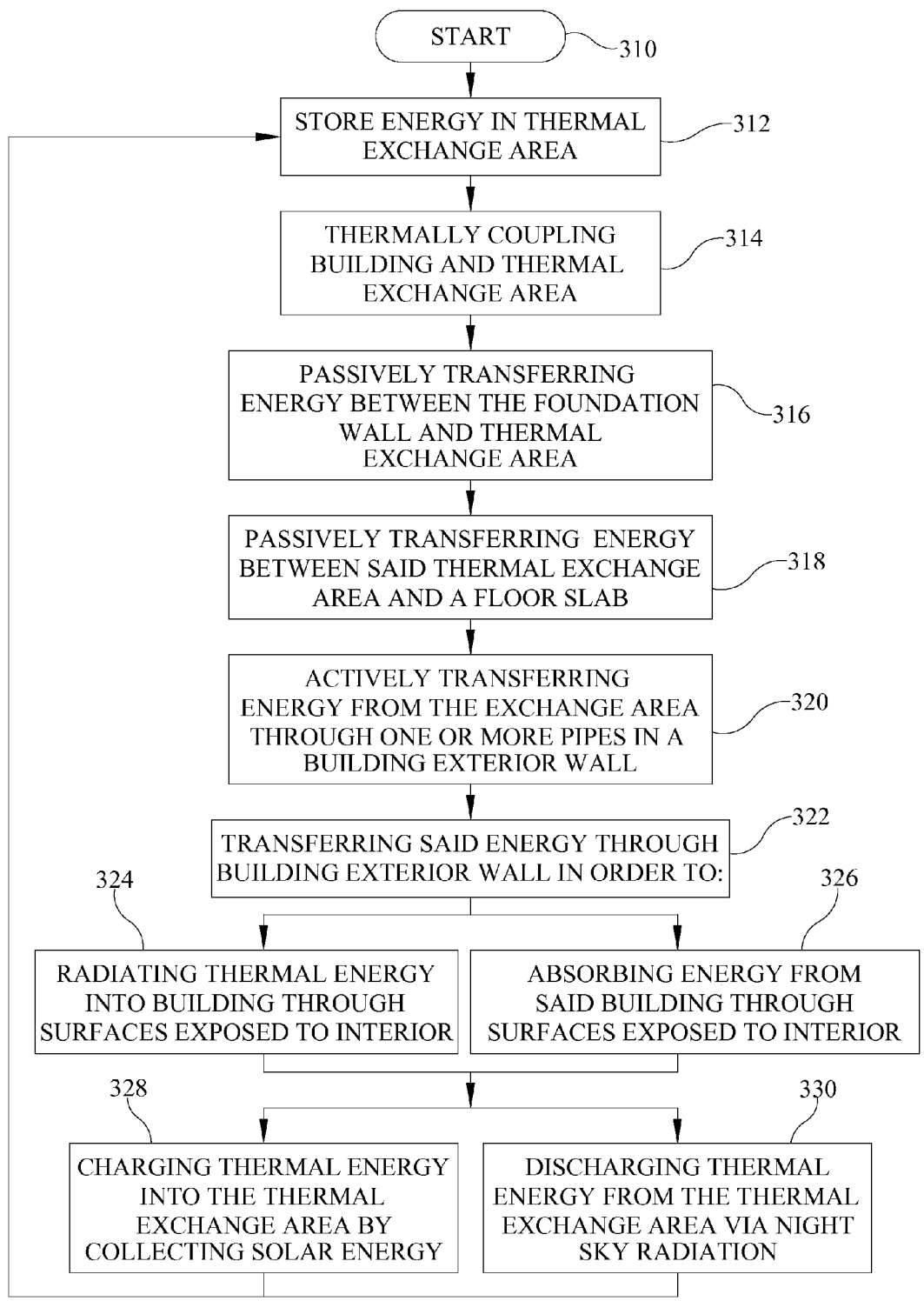

Referring now to FIG. 11, a flowchart is depicted which shows one embodiment of operation of the geosolar temperature control method of operation. The method begins at a starting point 310 where energy is stored in a thermal exchange area at step 312. This occurs through the use of the geosolar thermal transfer system 40, for example. Next, the building 10 is thermally coupled to the thermal exchange area at step 314. As previously described, this occurs by removing insulation along the interior surfaces of the foundation wall and at a depth below the known frost line for a given region where the building 10 is located. Next, energy is passively transferred from the foundation wall to the thermal exchange area beneath the building at step 316. Additionally, at step 318, energy is passively transferred between the thermal exchange area and the floor slab 20.

In addition to this passive transfer of thermal energy, the system actively transfers thermal energy from the exchange area through one or more pipes and a building exterior wall at step 320. The thermal energy is transferred through the building exterior walls, at step 322, in order to either radiate thermal energy into the building through exposed surfaces at step 324, or absorb thermal energy from the building through exposed surfaces at step 326.

Subsequently, the thermal exchange area is either charged by the solar collector at step 328 or the thermal energy is discharged from the thermal exchange area via night sky radiation at step 330. In the event of charging of the thermal exchange area, the process returns back to step 312 where the energy collected is stored in the thermal exchange area and the process begins again. Although the single embodiment is described, alternate steps or order of steps may be utilized and are considered to be within the scope of the present invention.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

What is claimed is:

1. A geosolar temperature control building construction system wherein a concrete wall defines a temperature delivery system, comprising:

said concrete wall having insulation on at least an outwardly facing surface, said concrete wall having a first portion positioned at a first elevation relative to the earth, said first elevation being below a grade where said building construction is located;

a passive thermal transfer system comprising an inwardly facing surface of said concrete wall being free of insulation at said first elevation to expose said concrete wall to thermal conditions at said first elevation and thermally couple said building to said earth;

said concrete wall defining an exterior wall of said building construction generally near a floor slab, said floor slab positioned at a second elevation of said concrete wall above said first elevation, said concrete wall having a second portion above said second elevation;

an active thermal transfer system comprising a closed loop piping system having a plurality of horizontally extending pipes disposed beneath said floor slab, said plurality of horizontally extending pipes further extending upwardly within said insulated concrete wall and into said second portion;

a first thermal transfer liquid passing through said closed loop piping system, said first thermal transfer fluid receiving thermal energy in said horizontally extending pipes beneath said slab from at least one temperature controlled zone and actively transferring said thermal energy to said exterior wall;

said exterior wall having a plurality of uninsulated surfaces adjacent an inside surface of said exterior wall within said building, said closed loop piping of said active thermal transfer system disposed adjacent said uninsulated surfaces to transfer thermal energy into or out of the building and control interior building temperature; and, a geosolar thermal transfer system comprising a solar collector and at least one vertically extending solar recharge loop, said geosolar thermal transfer system one of: (a) receiving solar energy for storage in the earth beneath a lowermost floor of said building downward and within a perimeter of said concrete wall or (b) discharging thermal energy from the ground to atmosphere to create said at least one temperature controlled zone in the earth beneath a lowermost position of said building and downward and within a perimeter of said concrete wall.

2. The geosolar temperature control building construction of claim 1, further comprising a plurality of temperature controlled zones beneath said building construction.

3. The geosolar temperature control building construction of claim 2, wherein one of said plurality of temperature controlled zones is a comfort zone having a temperature of between about 50 degrees and 90 degrees.

4. The geosolar temperature control building construction of claim 1, said closed loop piping of said active thermal transfer system extending along a roof of said building.

5. The geosolar temperature control building construction of claim 1 wherein said geosolar thermal transfer system discharges thermal energy from the earth in the area adjacent said recharge loop at least in the winter season.

6. The geosolar temperature control building construction of claim 1 wherein said geosolar thermal transfer system charges thermal energy in the earth in the area adjacent said recharge loop at least in the summer season.

7. The geosolar temperature control building construction of claim 1 wherein said insulated concrete wall is formed of one of cast-in-place concrete, pre-cast concrete, core-filled concrete block, or insulated concrete form.

8. The geosolar temperature control building construction of claim 1, at least one of said plurality of exposed surfaces being adjacent an exterior window.

9. A geosolar temperature control building construction, comprising:

an insulated concrete wall having a lower portion below grade elevation and an upper portion above said grade elevation, and said insulated concrete wall defining a portion of a building envelope;

a floor slab disposed near grade elevation and adjacent to said insulated concrete wall at a surface of said wall;

said lower portion having an inwardly facing surface free of insulation defining exposed concrete at a depth below said grade elevation;

said exposed concrete coupled to a temperature zone exterior to and beneath a lowermost point of said building envelope and passively transferring thermal energy at a desired temperature to said building envelope to buffer ambient temperature conditions;

an active thermal transfer system comprising piping disposed within said upper portion of said insulated concrete wall having a first thermal transfer fluid therein;

a geosolar thermal transfer system comprising at least one horizontally extending pipe beneath said floor slab, said at least one horizontally extending pipe in fluid communication with said active thermal transfer system;

said active thermal transfer system having at least one pipe thermally coupled to said building interior to heat or to cool said building interior and maintain interior thermal comfort by positioning said at least one pipe along an uninsulated area of said upper portion of said concrete wall adjacent said building interior;

said geosolar thermal transfer system further comprising a solar collector to charge or discharge thermal energy from a second thermal transfer fluid, said second thermal transfer fluid capable of being mixed with said first thermal transfer fluid to control temperature within said building envelope.

10. The geosolar temperature control building construction of claim 9, wherein said at least one horizontal pipe of said geosolar thermal transfer system beneath said floor slab creates temperature zones beneath said building and said piping of said active thermal transfer system receives said thermal energy within said temperature zone by passing said first thermal transfer fluid therethrough.

11. The geosolar temperature control building construction of claim 9, said geosolar thermal transfer system capable of storing thermal energy in or discharging thermal energy from the earth beneath said building construction.

12. The geosolar temperature control building construction of claim 11, said stored thermal energy capable of being harvested for building warming.

13. The geosolar temperature control building construction of claim 11, said discharged thermal energy creating areas of decreased temperature which are harvested for building cooling.

14. A geosolar temperature control building wherein an insulated concrete wall defines a temperature delivery system, comprising:

an insulated concrete wall having an upper exterior portion generally above grade and an insulated foundation portion generally below grade;

said insulated foundation portion having an inwardly facing surface being free of insulation;

said insulated foundation portion defining a thermal exchange and storage area in the earth below a lowermost floor of said building downward and within a perimeter of said insulated foundation portion which define a plurality of temperature zones;

an active thermal transfer system having a first thermal transfer fluid and a plurality of pipes extending upwardly into said concrete wall and a plurality of distribution loops extending substantially vertically into the earth and beneath said building;

a geosolar thermal transfer system having a second thermal transfer fluid and a plurality of recharge loops extending substantially vertically into the earth, said recharge loops charging or discharging the earth with thermal energy;

said plurality of distribution loops absorbing or discharging said thermal energy and passing said first thermal transfer fluid into said concrete wall building envelope;

said exterior wall having at least one non-insulated interior wall surface on an interior of said building, at least one of said plurality of pipes disposed within said upper exterior portion of said building, said non-insulated wall surface radiating or absorbing thermal energy transferred from said at least one of said plurality of pipes to control interior building temperature; and said geosolar thermal transfer system further comprising a solar collector for collection of solar energy or discharge of thermal energy, said solar collector in thermal communication with said second thermal transfer fluid and said plurality of recharge loops.

15. The geosolar temperature control building of claim 14, said plurality of distribution loops and said plurality of recharge loops being substantially vertically oriented beneath said floor slab.

16. The geosolar temperature control building of claim 15, said plurality of recharge loops being surrounded by said plurality of distribution loops.

17. The geosolar temperature control building of claim 16, said first thermal transfer fluid being separate from said second thermal transfer fluid.

* * * * *